United States Patent
Asai et al.

(10) Patent No.: US 10,054,508 B2
(45) Date of Patent: Aug. 21, 2018

(54) CONNECTOR WITH SENSOR

(71) Applicants: SUMITOMO RIKO COMPANY LIMITED, Komaki-shi, Aichi (JP); HONDA MOTOR CO., LTD., Tokyo (JP)

(72) Inventors: Takahiro Asai, Komaki (JP); Yuki Takahashi, Komaki (JP); Yusuke Sakaguchi, Wako (JP)

(73) Assignees: SUMITOMO RIKO COMPANY LIMITED, Komaki (JP); HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/627,711

(22) Filed: Jun. 20, 2017

(65) Prior Publication Data

US 2018/0003583 A1 Jan. 4, 2018

(30) Foreign Application Priority Data

Jun. 29, 2016 (JP) .................................. 2016-128297

(51) Int. Cl.
| | |
|---|---|
| *G01L 19/14* | (2006.01) |
| *G01L 19/00* | (2006.01) |
| *F02M 25/08* | (2006.01) |
| *B60K 15/035* | (2006.01) |

(52) U.S. Cl.
CPC ......... *G01L 19/147* (2013.01); *F02M 25/089* (2013.01); *G01L 19/0038* (2013.01); *G01L 19/0061* (2013.01); *B60K 15/03504* (2013.01)

(58) Field of Classification Search
CPC ...................................................... G01L 19/147
USPC ............................................. 73/756; 439/180
See application file for complete search history.

(56) References Cited

U.S. PATENT DOCUMENTS

| | | | |
|---|---|---|---|
| 7,503,784 B2* | 3/2009 | Osborne ................. | F16L 37/00 285/305 |
| 8,002,315 B2* | 8/2011 | Engle ....................... | G01K 1/14 137/557 |
| 2012/0247179 A1 | 10/2012 | Kerin et al. | |

FOREIGN PATENT DOCUMENTS

| | | | |
|---|---|---|---|
| JP | 2008-215609 A | | 9/2008 |
| JP | 2009068350 A | * | 4/2009 |
| JP | 2012-220025 A | | 11/2012 |
| WO | WO 2012030775 A1 | * | 3/2012 ............ F16L 37/098 |

* cited by examiner

*Primary Examiner* — Harshad R Patel
*Assistant Examiner* — Jamel Williams
(74) *Attorney, Agent, or Firm* — Oliff PLC (57) ABSTRACT

A connector includes a resin-made connector body and a pressure sensor. The connector body includes a first main tubular part that is connected to a first pipe, a second main tubular part that is connected to a second pipe, and a sensor mounting part. The first main tubular part and the second main tubular part connect with each other to form an angle. The sensor mounting part includes: a tubular intake part that is formed in line with a line extending from one of the first main tubular part and the second main tubular part and has a bottom face; and a sensor mounting seat that is capable of being mounted with the pressure sensor and communicates with a peripheral-surface opening of the tubular intake part.

8 Claims, 6 Drawing Sheets

CONNECTOR WITH SENSOR

CROSS REFERENCE TO RELATED APPLICATIONS

This application claims priority based on Japanese Patent Application No. 2016-128297 filed on Jun. 29, 2016, the entire contents of which are incorporated by reference herein.

1. Technical Field

The present invention relates to a connector with a sensor.

2. Background Art

A connector that can easily be mounted with a pipe is known for use in a fuel line. The fuel line is also provided with a sensor that detects fluid pressure. Japanese Unexamined Patent Publication Nos. 2012-220025 (JP2012-220025A) and 2008-215609 (JP2008-215609A) each disclose a connector with a sensor.

The connector disclosed in JP2012-220025A has a connector body mounted with the sensor that is separate from the connector body. Specifically, the connector body has a straight passage and also has a branch passage at a midpoint of the straight passage for sensor detection. The sensor is mounted in the branch passage. The connector disclosed in JP2008-215609A is provided integrally with the sensor.

SUMMARY

The connector body of the connector is made of resin. In some cases, the connector body is formed with an opening used only for insertion of a mold in formation of a passage. Such an opening is closed with a cover member. However, it is necessary to design the joint portion between the connector body and the cover member with sufficient care in order to improve fuel impermeant performance. For this reason, it is required that the connector body does not form an opening which requires a cover member.

In the case of the connector disclosed in JP2012-220025A, a detecting element of the sensor is coaxially inserted into an intake passage branching off from the connector body. With such a shape, the connector body includes an opening into which a first pipe is inserted, an opening to which a second pipe is mounted, and an opening into which the sensor is inserted, and not another opening. As such, this connector body has satisfactory fuel impermeant performance.

In order for the connector body not to have an opening that requires the cover member, the connector body is subject to shape limitation. An installation space for the sensor in particular needs to be factored in, so that flexibility is required in location of the sensor. The connector body disclosed in JP2012-220025A, however, has a low degree of flexibility in location of the sensor.

In cases where, the sensor is disposed at a peripheral surface of a tubular intake part instead of being coaxially inserted into the tubular intake part as in the case of the connector body disclosed in JP2012-220025A, there is a possibility that a cover member is still required.

An object of the present invention is to provide a connector with a sensor that has a connector body requiring no cover member even when the sensor is structurally disposed at a peripheral surface of a tubular intake part.

A connector according to the present invention includes: a connector body that is made of resin and includes a first main tubular part configured to be connected to a first pipe, a second main tubular part configured to be connected to a second pipe, and a sensor mounting part; and a pressure sensor that is mounted to the sensor mounting part and detects pressure of fluid that passes through the connector body.

The first main tubular part and the second main tubular part connect with each other to form an angle. The sensor mounting part includes: a tubular intake part that is formed in line with a line extending from one of the first main tubular part and the second main tubular part and includes a bottom face; and a sensor mounting seat that is capable of being mounted with the pressure sensor and communicates with a peripheral-surface opening of the tubular intake part.

The first main tubular part and the second main tubular part connect with each other to form the angle, and the tubular intake part of the sensor mounting part is formed in line with the line extending from the one of the first main tubular part and the second main tubular part. Thus, formation of the tubular intake part of the sensor mounting part has only to require extension of a mold that is used for forming the one of the first main tubular part and the second main tubular part. For this reason, although having the bottom face, the tubular intake part does not require another opening.

In the sensor mounting part, the sensor mounting seat communicates with the peripheral-surface opening of the tubular intake part. Because the pressure sensor is mounted to the sensor mounting seat, the sensor mounting seat does not have any opening that requires a cover member. The connector body is thus free of any opening that requires a cover member even when the pressure sensor is structurally disposed at a peripheral surface of the tubular intake part. Accordingly, flexibility can improve in location of the pressure sensor while satisfactory fuel impermeant performance is retained.

DETAILED DESCRIPTION (1. Entire Configuration of Fuel Line 1)

Figure 1:
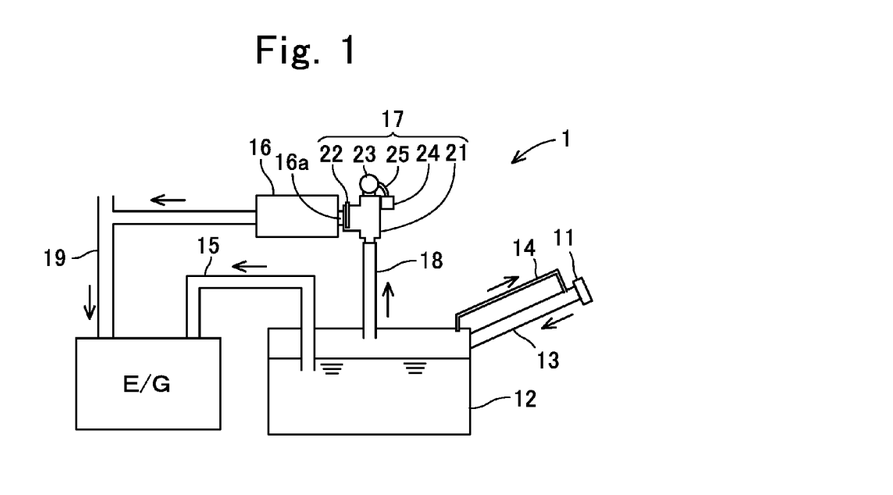
FIG. 1 illustrates an entire configuration of a fuel line according to an embodiment.

Referring to FIG. 1, a description is provided of an entire configuration of a fuel line 1 of an automobile. The fuel line 1 includes an oil filler port 11, a fuel tank 12, a filler pipe 13 that supplies fuel from the oil filler port 11 to the fuel tank 12, and a breather pipe 14 that returns fuel vapor from the fuel tank 12 to the oil filler port 11. The fuel line 1 also includes a feed pipe 15 that supplies the fuel from the fuel tank 12 to an engine E/G.

The fuel line 1 further includes a canister 16, a connector 17 with a sensor that is connected to a pipe 16a (corresponding to "a first pipe" in the present invention) of the canister 16, an Onboard Refueling Vapor Recovery (ORVR) pipe 18 (corresponding to "a second pipe" in the present invention) connecting the fuel tank 12 and the connector 17 with the sensor, and purge piping 19 providing a connection between the canister 16 and the engine E/G. It is to be noted that although not illustrated, the pipes and the piping are each provided with, for example, a valve and a pump.

The connector 17 with the sensor (hereinafter referred to as "the connector") includes a connector body 21, a retainer 22, the pressure sensor 23, an atmospheric-air box cover 24, and an atmospheric-air intake pipe 25. The connector body 21 is connected to the ORVR pipe 18 and the pipe 16a provided to the canister 16. In other words, the connector body 21 relays the fuel vapor from the ORVR pipe 18 to the canister 16. The retainer 22 is held by the connector body 21 to lock the pipe 16a.

The pressure sensor 23 is provided to the connector body 21 and detects pressure of fluid that passes through the connector body 21. The fluid pressure detected by the pressure sensor 23 is supplied to a controller (not illustrated) and is used for control of the pump (not illustrated) provided to the feed pipe 15 as well as for control of the valves (not illustrated) provided to the pipes. The atmospheric-air box cover 24 is provided to the connector body 21 to receive atmospheric air. The atmospheric-air intake pipe 25 connects the atmospheric-air box cover 24 and the pressure sensor 23, thus introducing the atmospheric air from the atmospheric-air box cover 24 into the pressure sensor 23. It is to be noted that structural details of the connector 17 are described later.

(2. Structural Details of Connector Body 21 and Retainer 22)

Referring to FIGS. 2 to 7, a description is provided next of structural details of the connector body 21 and the retainer 22 of the connector 17. The connector body 21 and the retainer 22 are made of resin.

The connector body 21 includes a first main tubular part 30, a second main tubular part 40, and a sensor mounting part 50. A tubular connecting part 31 of the first main tubular part 30, the second main tubular part 40, and the sensor mounting part 50 are formed integrally by injection molding. A retainer mounting part 36 of the first main tubular part 30 is formed separately from the tubular connecting part 31 of the first main tubular part 30 and is fitted to the tubular connecting part 31. It is to be noted that the retainer mounting part 36 of the first main tubular part 30 too can be formed integrally with the tubular connecting part 31 of the first main tubular part 30, the second main tubular part 40, and the sensor mounting part 50 by injection molding.

The first main tubular part 30 is formed to be straight and has openings in its both ends, respectively. This means that the first main tubular part 30 has a straight passage. The first main tubular part 30 is connected to the pipe 16a (shown in FIGS. 1 and 2) of the canister 16. In the present embodiment, the pipe 16a of the canister 16 is inserted into the first main tubular part 30 and is made detachable by the retainer 22. The pipe 16a is made of metal, has a tubular shape and includes, at a distance from its leading end, an annular protrusion (also referred to as a flange or a bead) 16a1 formed to protrude radially outward.

The first main tubular part 30 includes the tubular connecting part 31, the retainer mounting part 36, and a seal member 38. As described above, the tubular connecting part 31 and the retainer mounting part 36 are formed separately and are fitted to each other. The tubular connecting part 31 and the retainer mounting part 36 are both formed to have straight tubular shapes. The tubular connecting part 31 has such an inner peripheral surface as to enable insertion of a leading portion of the pipe 16a. This tubular connecting part 31 is formed with, on its outer peripheral surface, a plurality of projections 31a for phase determination with respect to the retainer mounting part 36.

The retainer mounting part 36 is formed to have a larger diameter than the tubular connecting part 31 and is coaxially connected to the tubular connecting part 31 by being fitted to the outer peripheral surface of the tubular connecting part 31. The retainer mounting part 36 has a plurality of recesses 36a that respectively fit the plurality of projections 31a of the tubular connecting part 31. This retainer mounting part 36 has such an inner peripheral surface as to enable insertion of the annular protrusion 16a1 of the pipe 16a. Moreover, the retainer mounting part 36 is formed with a peripheral-surface opening 36b that is radially cut through, whereby the retainer 22 is held to be radially movable.

The seal member 38 is provided on one of the inner peripheral surface of the tubular connecting part 31 and the inner peripheral surface of the retainer mounting part 36 while being axially sandwiched between the tubular connecting part 31 and the retainer mounting part 36. The seal member 38 is formed of, for example, a plurality of O-rings and a collar member sandwiched between the plurality of O-rings. This seal member 38 seals between the tubular connecting part 31 and the retainer mounting part 36 and also seals between one of the tubular connecting part 31 and the retainer mounting part 36 and an outer peripheral surface of the pipe 16a.

The second main tubular part 40 is formed integrally with the tubular connecting part 31 of the first main tubular part 30. The second main tubular part 40 is formed to be straight and has openings in its both ends, respectively. This means that the second main tubular part 40 has a straight passage. The first main tubular part 30 and the second main tubular part 40 connect with each other to form an angle. In the present embodiment, the angle formed by the first main tubular part 30 and the second main tubular part 40 that connect with each other is 90°. However, the first main tubular part 30 and the second main tubular part 40 may form any angle including but not limited to 90° provided that the angle does not result in a linear form.

Figure 6:
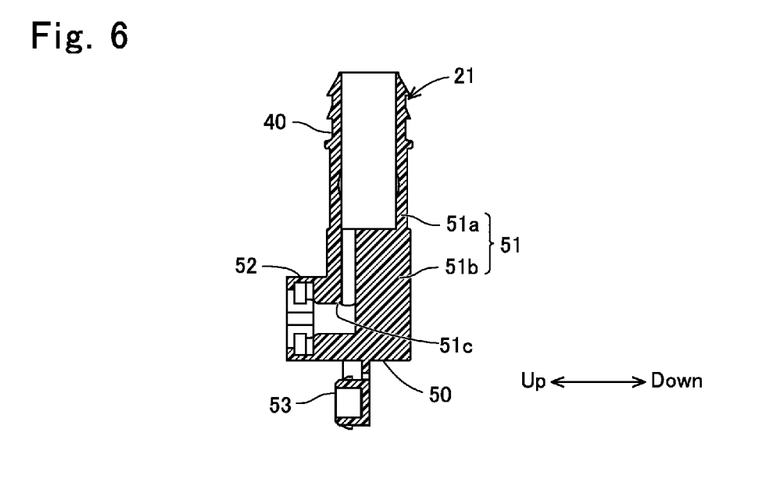
FIG. 6 is a sectional view of the connector body and the retainer, the section being taken along arrowed line VI-VI in FIG. 2.
Figure 7:
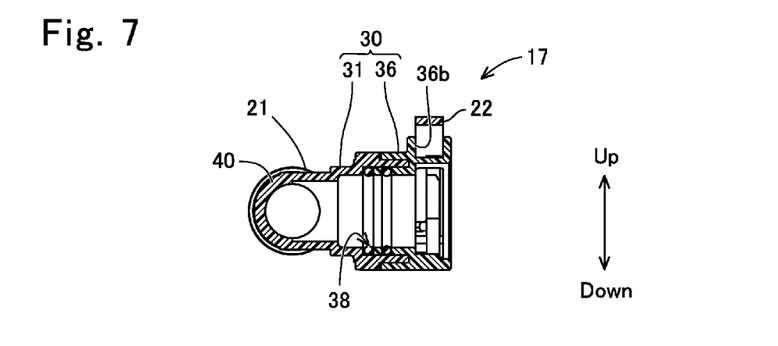
FIG. 7 is a sectional view of the connector body and the retainer, the section being taken along arrowed line VII-VII in FIG. 2.

Further, as shown in FIGS. 6 and 7, the passage formed by the inner peripheral surface of the second main tubular part 40 is formed such that the central axis of the passage of the second main tubular part 40 intersect with the central axis of the passage formed by the inner peripheral surface of the first main tubular part 30. As shown in FIG. 7, the passage of the second main tubular part 40 has a diameter that is slightly smaller than a minimum diameter of a passage of the tubular connecting part 31 of the first main tubular part 30. This means that in a mold used for injection molding, a core (not illustrated) that is used for forming the inner peripheral surface of the tubular connecting part 31 of the first main tubular part 30 can be connected without fail to a core (not illustrated) that is used for forming the inner peripheral surface of the second main tubular part 40. It is to be noted that these diameters can be made opposite in size.

An outer peripheral surface of the second main tubular part 40 has the form of a fir tree or a bamboo shoot, meaning that it is formed to have a plurality of annular protrusions each having an acute peripheral edge. The ORVR pipe 18 (shown in FIGS. 1 and 2) is connected to this second main tubular part 40. The ORVR pipe 18 is a thin-walled pipe made of resin. This ORVR pipe 18 is fitted over the outer peripheral surface of the second main tubular part 40 at its end and undergoes plastic deformation, thereby being fitted to the outer peripheral surface of the second main tubular part 40.

The sensor mounting part 50 is provided to extend, from apart (bend) where the first main tubular part 30 and the second main tubular part 40 connect with each other, in a direction different from those of the first main tubular part 30 and the second main tubular part 40. The sensor mounting part 50 is formed integrally with the tubular connecting part 31 of the first main tubular part 30 and the second main tubular part 40.

The sensor mounting part 50 includes a tubular intake part 51, a sensor mounting seat 52, and an atmospheric-air box base 53. In the present embodiment, the tubular intake part 51 is formed to be straight and to be in line with a line extending from the second main tubular part 40. It is to be noted that the tubular intake part 51 may be formed in line with a line extending from the first main tubular part 30 instead of being formed in line with the line extending from the second main tubular part 40.

As shown in FIG. 6, the tubular intake part 51 is formed to be straight, opens into the part where the first main tubular part 30 and the second main tubular part 40 connect with each other and is closed at its opposite end along its straight line. In other words, the tubular intake part 51 opens at one end of its straight line and has a bottom face at the opposite end of its straight line. The tubular intake part 51 includes a large-diameter part 51a positioned at the open end of the tubular intake part 51 (that is to say, at the part where the first main tubular part 30 and the second main tubular part 40 connect with each other), and a small-diameter part 51b positioned at the end having the bottom face. The large-diameter part 51a has a passage of relatively larger diameter, while the small-diameter part 51b has a passage of smaller diameter as compared with the passage of the large-diameter part 51a. The passage of the large-diameter part 51a is formed to be coaxial with the inner peripheral surface of the second main tubular part 40 and to have the same diameter as the inner peripheral surface of the second main tubular part 40. This means that the diameter of the passage of the large-diameter part 51a is slightly smaller than the diameter of the passage of the tubular connecting part 31 of the first main tubular part 30.

The diameter of the passage of the small-diameter part 51b is smaller than the diameter of the passage of the large-diameter part 51a. This means that the passage of the small-diameter part 51b is smaller in cross-sectional area than the passage of the large-diameter part 51a, the passage of the second main tubular part 40, and the passage of the tubular connecting part 31 of the first main tubular part 30. With the connector 17 being mounted to the automobile, the passage of the small-diameter part 51b is eccentric upward with respect to the passage of the large-diameter part 51a and the passage of the second main tubular part 40. The small-diameter part 51b of the tubular intake part 51 includes a peripheral-surface opening 51c (shown in FIG. 6) near the bottom face. With the connector 17 being mounted to the automobile, the peripheral-surface opening 51c opens upward.

Figure 5:
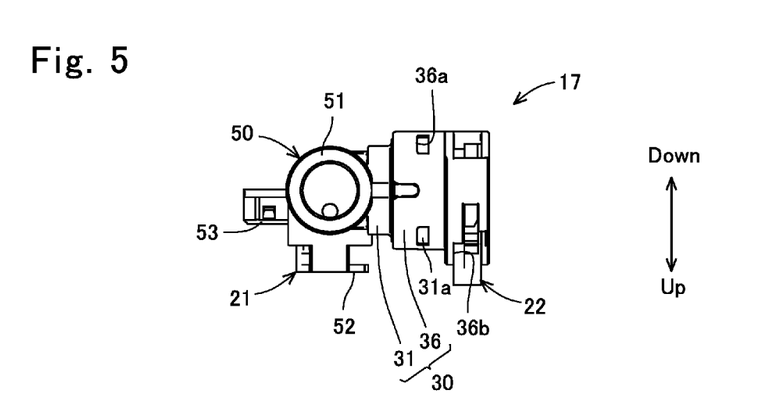
FIG. 5 is a plan view of the connector body and the retainer as seen in the direction of arrow V in FIG. 2.

As described above, the passage of the large-diameter part 51a of the tubular intake part 51 has the same shape (that is coaxial with and of the same diameter) as the passage of the second main tubular part 40. On the other hand, the passage of the small-diameter part 51b of the tubular intake part 51 is formed in line with only a partial line of a line extending from the passage of the second main tubular part 40. Thus, when the connector body 21 is viewed from the opening of the second main tubular part 40 as shown in FIG. 5, inner peripheral surfaces of the tubular intake part 51 all come into sight depth-ward.

The sensor mounting seat 52 communicates with the peripheral-surface opening 51c at an angle to the tubular intake part 51. This sensor mounting seat 52 is provided upwardly of the tubular intake part 51, extending from the peripheral-surface opening 51c. In other words, the sensor mounting seat 52 has an outer opening (opposite from the peripheral-surface opening 51c) that opens upward. A detecting element (not illustrated) of the pressure sensor 23 is inserted into a through hole of this sensor mounting seat 52. The outer opening of the sensor mounting seat 52 has the form of a flange. The pressure sensor 23 is secured in the outer opening of the sensor mounting seat 52.

Figure 2:
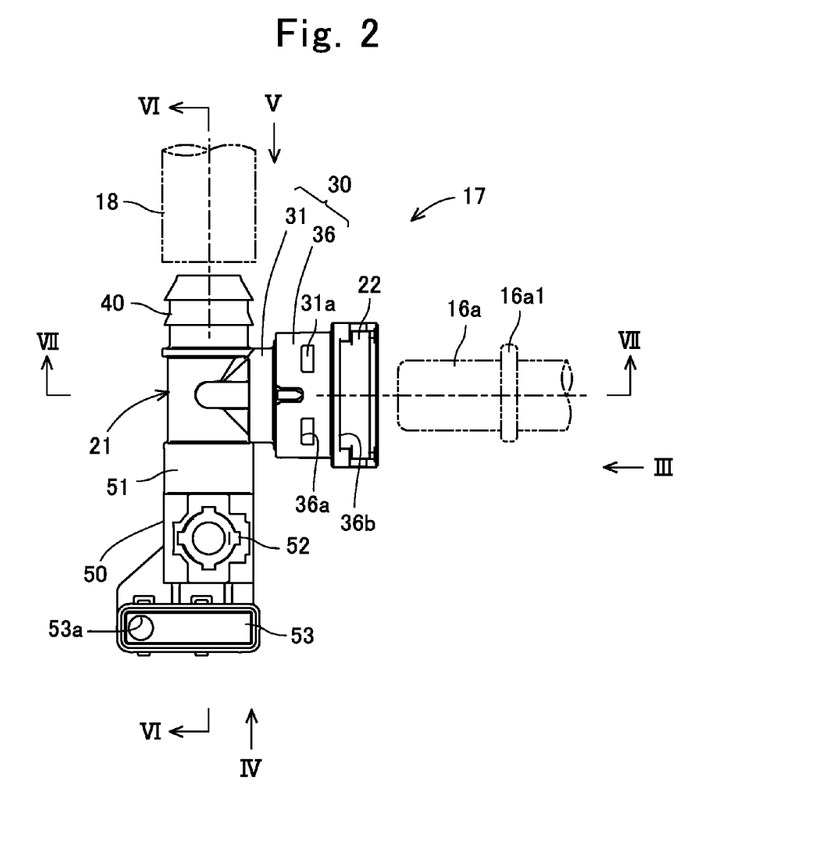
FIG. 2 is a front view of a connector body and a retainer that are shown in FIG. 1.
Figure 3:
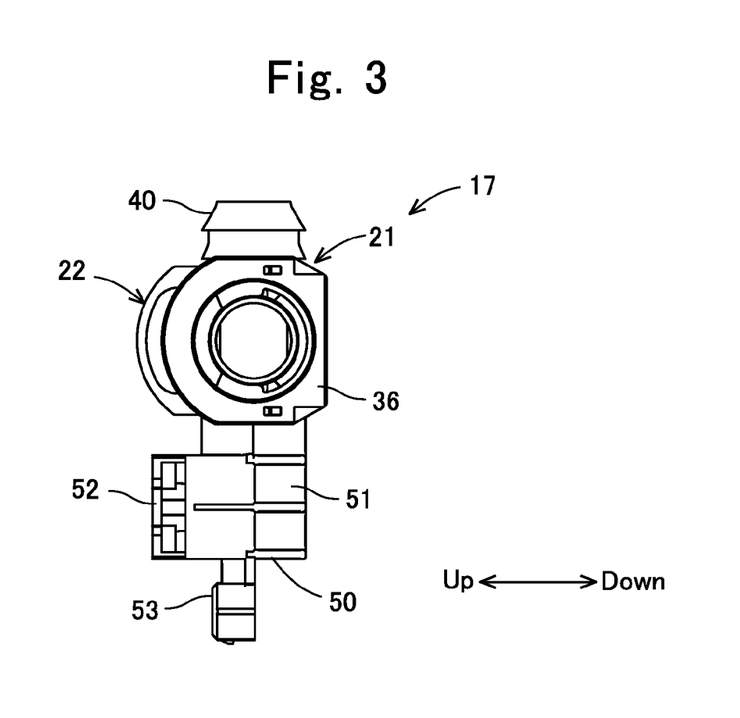
FIG. 3 illustrates the connector body and the retainer as seen in the direction of arrow III (from a right side) in FIG. 2.
Figure 4:
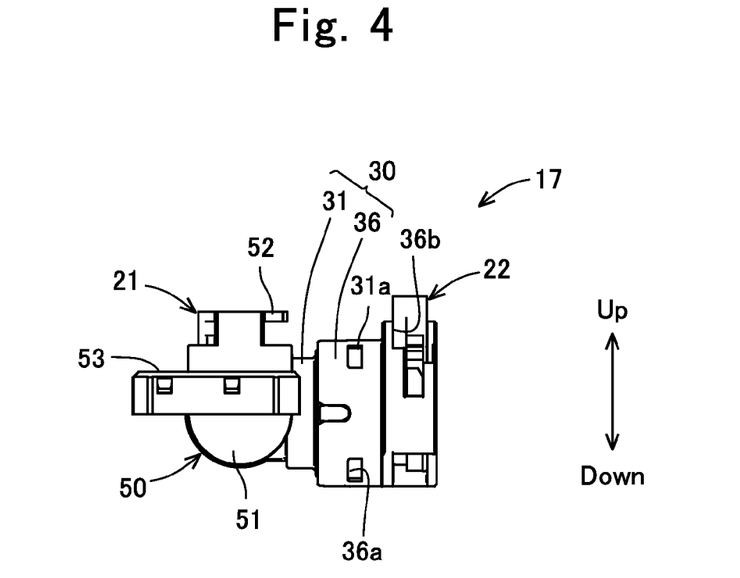
FIG. 4 is a bottom view of the connector body and the retainer as seen in the direction of arrow IV in FIG. 2.

The atmospheric-air box base 53 is provided outwardly of the bottom face of the tubular intake part 51 (that is to say, in a lower position of a paper surface in FIG. 2). The atmospheric-air box base 53 is a part to which the atmospheric-air box cover 24 (shown in FIG. 1) is fixed. This atmospheric-air box base 53 is formed to shape like a long coverless container. In other words, the atmospheric-air box base 53 is formed to have the shape of a rectangular parallelepiped that has an opening in its top. The atmospheric-air box base 53 is formed to have its length orthogonal to the passages of the tubular intake part 51.

The atmospheric-air box base 53 is formed with, in its lower face, a drain hole 53a that is circular. The drain hole 53a is formed in a position nearer to one side longitudinally of the atmospheric-air box base 53. The atmospheric-air box base 53 is positioned below the outer opening of the sensor mounting seat 52.

The retainer 22 is made of resin and is formed by injection molding. The retainer 22 is separate from the connector body 21 and is held by the connector body 21. When held by the connector body 21, the retainer 22 can lock the pipe 16a. Specifically, the retainer 22 is formed to be U-shaped and is disposed in the peripheral-surface opening 36b of the retainer mounting part 36 of the first main tubular part 30 in the connector body 21. The retainer 22 is radially movable with respect to the retainer mounting part 36.

An inner surface of the retainer 22 is formed to be capable of locking the annular protrusion 16a1 of the pipe 16a. It is to be noted, however, that whether the retainer 22 locks or does not lock the annular protrusion 16a1 depends on its position. In other words, the retainer 22 is provided to be movable between a locking position and a non-locking position in the retainer mounting part 36 with respect to the annular protrusion 16a1. FIGS. 2 to 7 each illustrate the retainer 22 in the non-locking position. The locking position is a position that the retainer 22 reaches as a result of being pushed into the retainer mounting part 36 from the non-locking position shown in each of these drawings.

In the present embodiment, the retainer mounting part 36 and the retainer 22 are structurally similar to those disclosed in JP2015-135128A. This means that the retainer 22 can be pushed into the first main tubular part 30 with the pipe 16*a* being inserted to a normal position in the first main tubular part 30. When pushed into the first main tubular part 30, the retainer 22 locks the annular protrusion 16*a*1 of the pipe 16*a*. The retainer 22 thus has such a checker function as to confirm whether the pipe 16*a* is inserted to the normal position in addition to such a function as to lock the pipe 16*a*. In addition to the structure as disclosed in JP2015-135128A, another structure such as disclosed in JP2015-086964A is also applicable to the retainer 22 having the checker function and the retainer mounting part 36.

The retainer 22 and the retainer mounting part 36 can structurally have no checker function. Structures such as disclosed in JP2011-058641A and JP2010-107033A can be adopted for the retainer 22 and the retainer mounting part 36 that have no checker function.

(3. Structural Details of Connector 17)

Referring to FIGS. 8 to 11, a description is provided next of structural details of the connector 17. As described above, the connector 17 includes the connector body 21, the retainer 22, the pressure sensor 23, the atmospheric-air box cover 24, and the atmospheric-air intake pipe 25.

Figure 8:
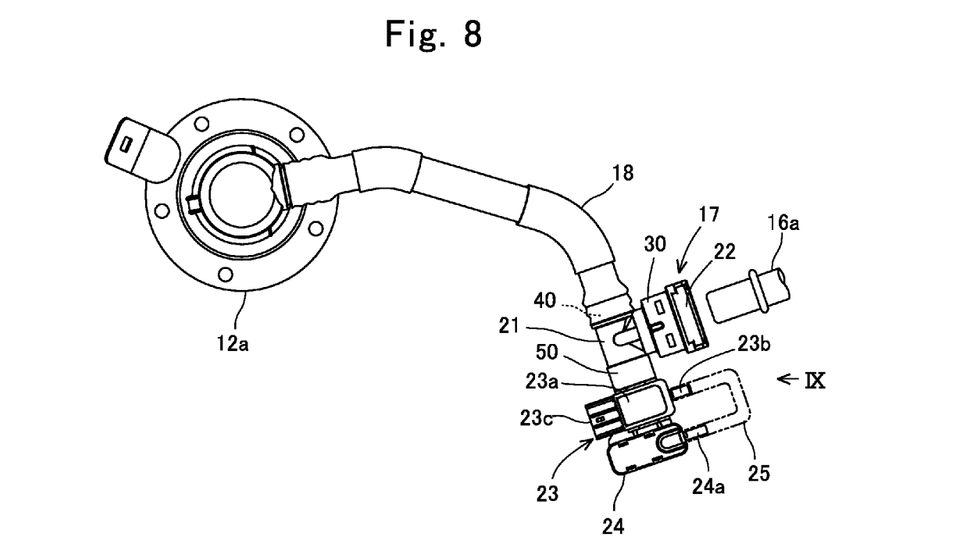
FIG. 8 is a plan view illustrating a configuration including a connector with a sensor and the connector's peripheral units.
Figure 9:
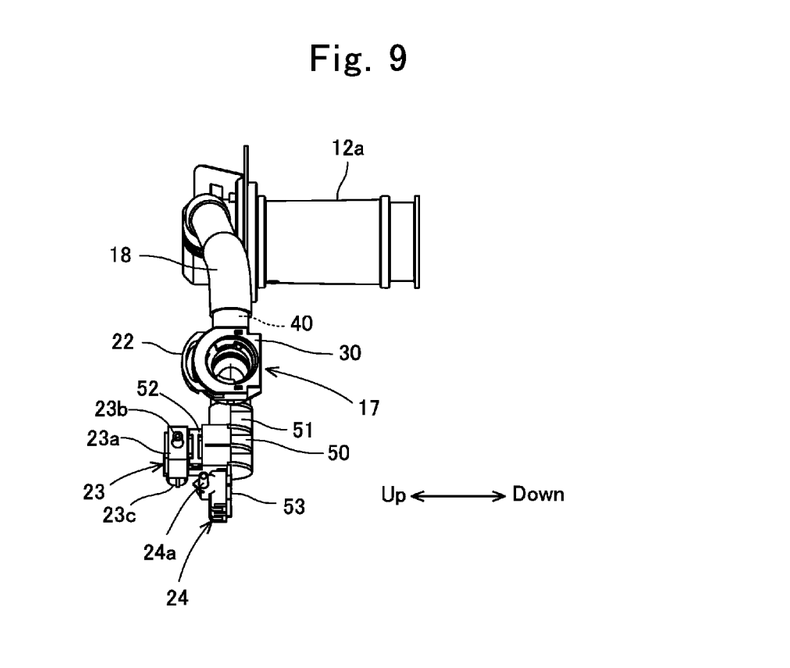
FIG. 9 illustrates the configuration including the connector with the sensor and the connector's peripheral units as seen in the direction of arrow IX in FIG. 8.

As shown in FIGS. 8 and 9, the pipe 16*a* of the canister 16 is inserted into the first main tubular part 30 of the connector body 21. The end of the ORVR pipe 18 is fitted exteriorly to the second main tubular part 40 of the connector body 21. A Vent Shaft Float (VSF) valve 12*a* disposed in the fuel tank 12 is connected to another end of the ORVR pipe 18.

The sensor mounting seat 52 of the connector body 21 is mounted with the pressure sensor 23. The pressure sensor 23 includes a nozzle (not illustrated) that is inserted into a tubular structure of a target of detection, a main unit 23*a* that detects a difference between the fluid pressure at a nozzle tip and atmospheric pressure used as reference pressure, and an atmospheric-air intake part 23*b* that takes in the atmospheric pressure as the reference pressure. The nozzle of the pressure sensor 23 is inserted into a tubular structure of the sensor mounting seat 52. The nozzle tip of the pressure sensor 23 may be positioned inside the tubular intake part 51 or inside the sensor mounting seat 52.

The main unit 23*a* of the pressure sensor 23 is fixed to an upper face of the sensor mounting seat 52. The atmospheric-air intake part 23*b* is formed to have a tubular shape and to extend horizontally from a lateral face of the main unit 23*a*. This means that the main unit 23*a* of the pressure sensor 23 detects the pressure of the fluid that passes through the connector body 21 on the basis of the atmospheric pressure. The main unit 23*a* is provided with, at its lateral face opposite from the atmospheric-air intake part 23*b*, an electric connector 23*c* to which a signal line is connected. The electric connector 23*c* outputs an electric signal corresponding to the pressure detected.

The atmospheric-air box base 53 of the connector body 21 is mounted with the atmospheric-air box cover 24. The atmospheric-air box base 53 and the atmospheric-air box cover 24 are described with reference to FIGS. 10 and 11. The atmospheric-air box cover 24 is provided to cover the opening of the atmospheric-air box base 53. In other words, the atmospheric-air box cover 24 is formed to have the shape of a long lid having an opening in its bottom. A space is thus defined between the atmospheric-air box base 53 and the atmospheric-air box cover 24 to receive the atmospheric air through the drain hole 53*a*.

Figure 10:
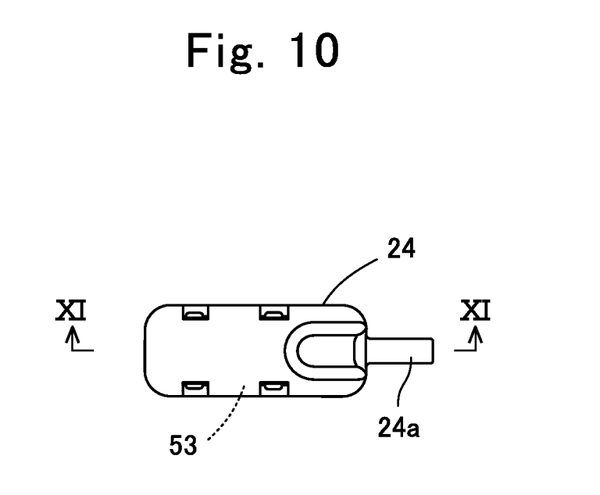
FIG. 10 is a plan view of an atmospheric-air box base and an atmospheric-air box cover that are shown in FIG. 8.
Figure 11:
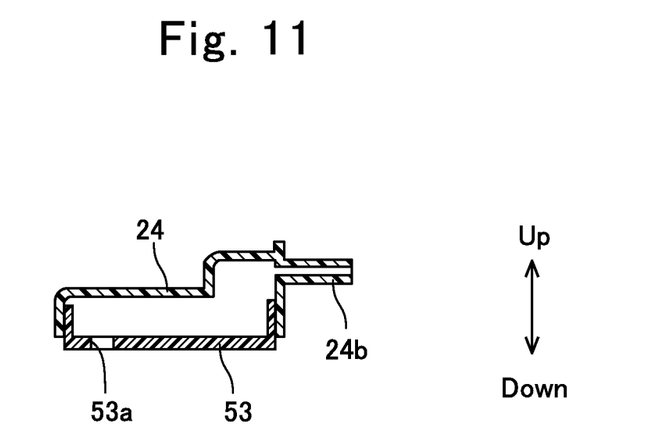
FIG. 11 is a sectional view of the atmospheric-air box base and the atmospheric-air box cover, the section being taken along arrowed line XI-XI in FIG. 10.

A pipe mounting part 24*a* is provided on a lateral face longitudinally of the atmospheric-air box cover 24. While the drain hole 53*a* is formed at one end longitudinally of the atmospheric-air box base 53, the pipe mounting part 24*a* is formed on an end longitudinally of the atmospheric-air box cover 24 that is opposite from the drain hole 53*a*. In other words, the drain hole 53*a* and the pipe mounting part 24*a* are disposed to be longitudinally opposite from each other. The pipe mounting part 24*a* is thus in a position far from the drain hole 53*a* longitudinally of the atmospheric-air box base 53 and the atmospheric-air box cover 24.

With the atmospheric-air box cover 24 being mounted to the atmospheric-air box base 53, the pipe mounting part 24*a* is provided on an upper portion of the lateral face of the atmospheric-air box cover 24. Thus, the pipe mounting part 24*a* is positioned even vertically far from the drain hole 53*a*. It is to be noted that the pipe mounting part 24*a* may be provided on an upper face of the atmospheric-air box cover 24 instead of being provided on the lateral face longitudinally of the atmospheric-air box cover 24.

The pipe mounting part 24*a* is provided to extend horizontally. This pipe mounting part 24*a* of the atmospheric-air box cover 24 is positioned near the atmospheric-air intake part 23*b* of the pressure sensor 23 to parallel the atmospheric-air intake part 23*b*. Moreover, this pipe mounting part 24*a* of the atmospheric-air box cover 24 is positioned below the atmospheric-air intake part 23*b* of the pressure sensor 23. It follows from this that the drain hole 53*a* of the atmospheric-air box base 53 is positioned below the atmospheric-air intake part 23*b* of the pressure sensor 23.

The atmospheric-air intake pipe 25 is a rubber pipe that connects the atmospheric-air intake part 23*b* of the pressure sensor 23 and the pipe mounting part 24*a* of the atmospheric-air box cover 24. This means that the atmospheric-air intake pipe 25 introduces the atmospheric air from the space that is defined by the atmospheric-air box base 53 and the atmospheric-air box cover 24 into a reference-pressure area of the pressure sensor 23.

(4. Effects)

The connector 17 includes the resin-made connector body 21 and the pressure sensor 23. The connector body 21 includes the first main tubular part 30 connected to the pipe 16*a*, the second main tubular part 40 connected to the ORVR pipe 18, and the sensor mounting part 50. The pressure sensor 23 is mounted to the sensor mounting part 50 and detects the pressure of the fluid that passes through the connector body 21.

The first main tubular part 30 and the second main tubular part 40 connect with each other to form the angle. The sensor mounting part 50 includes: the tubular intake part 51 that is formed in line with the line extending from one of the first main tubular part 30 and the second main tubular part 40 and has the bottom face; and the sensor mounting seat 52 that is capable of being mounted with the pressure sensor 23 and communicates with the peripheral-surface opening 51*c* of the tubular intake part 51.

As described above, the first main tubular part 30 and the second main tubular part 40 connect with each other to form the angle, and the tubular intake part 51 of the sensor mounting part 50 is formed in line with the line extending from the one of the first main tubular part 30 and the second main tubular part 40. Thus, formation of the tubular intake part 51 of the sensor mounting part 50 has only to require extension of a mold that is used for forming the one of the first main tubular part 30 and the second main tubular part 40. For this reason, although having the bottom face, the tubular intake part 51 does not require another opening.

In the sensor mounting part 50, the sensor mounting seat 52 communicates with the peripheral-surface opening 51c of the tubular intake part 51. Because the pressure sensor 23 is mounted to the sensor mounting seat 52, the sensor mounting seat 52 does not have any opening that requires a cover member. The connector body 21 is thus free of any opening that requires a cover member even when the pressure sensor 23 is structurally disposed at a peripheral surface of the tubular intake part 51. Accordingly, flexibility can improve in location of the pressure sensor 23 while satisfactory fuel impermeant performance is retained.

In the above embodiment, the tubular intake part 51 has the small-diameter part 51b, and the passage of this small-diameter part 51b is smaller in cross-sectional area than the passage of the second main tubular part 40. In addition, the passage of the small-diameter part 51b of the tubular intake part 51 is entirely formed in line with only the partial line of the line extending from the passage of the second main tubular part 40. In this case, the small-diameter part 51b of the tubular intake part 51 can be formed by making a leading end of a mold (the core) that is used for forming the second main tubular part 40 slenderer. In cases where the tubular intake part 51 is formed in line with the line extending from the first main tubular part 30 in a modification of the embodiment, the tubular intake part 51 has a small-diameter part 51b having a passage that is smaller in cross-sectional area than the passage of the first main tubular part 30. Moreover, the entire passage of this small-diameter part 51b of the tubular intake part 51 is formed in line with only a partial line of a line extending from the passage of the first main tubular part 30. In this case, the small-diameter part 51b of the tubular intake part 51 can be formed by making a leading end of a mold (the core) that is used for forming the first main tubular part 30 slenderer.

The respective passages of the first main tubular part 30 and the second main tubular part 40 that form a main passage of the connector 17 are required to have a cross-sectional area corresponding to a flow rate of the fuel that should pass through. On the other hand, the passage of the small-diameter part 51b of the tubular intake part 51 may be smaller in cross-sectional area than the respective passages of the first main tubular part 30 and the second main tubular part 40 as long as the fluid pressure can be detected. With the passage of the small-diameter part 51b of the tubular intake part 51 being slenderer, passage of the fluid through the first main tubular part 30 and the second main tubular part 40 is less affected. Thus, even when there is a bend between the first main tubular part 30 and the second main tubular part 40, the passage of the fluid can be made less affected.

The sensor mounting part 50 further includes the atmospheric-air box base 53. The connector 17 further includes the atmospheric-air box cover 24 that is mounted to the atmospheric-air box base 53 to receive the atmospheric air in association with the atmospheric-air box base 53, and the atmospheric-air intake pipe 25 connecting the pressure sensor 23 and the atmospheric-air box cover 24. The pressure sensor 23 detects the pressure of the fluid that passes through the connector body 21 on the basis of the atmospheric pressure in the space defined by the atmospheric-air box base 53 and the atmospheric-air box cover 24.

As such, the connector body 21 includes the atmospheric-air box base 53 and is mounted not only with the pressure sensor 23 but also with the atmospheric-air box cover 24. In other words, the connector 17 completes its function as a unit that includes the pressure sensor 23 and an atmospheric-air box formed of the atmospheric-air box base 53 and the atmospheric-air box cover 24. The pressure sensor 23 and the atmospheric-air box cover 24 are both not mounted to the first main tubular part 30 nor to the second main tubular part 40, but to the sensor mounting part 50. Accordingly, design of the first main tubular part 30 and the second main tubular part 40 is less affected. This means that the respective passages of the first main tubular part 30 and the second main tubular part 40 that form the main passage of the connector 17 can be designed to have such shapes that a reference is made to previous results. Consequently, the connector 17 can function without fail.

The atmospheric-air box base 53 has the drain hole 53a, and this drain hole 53a is formed below the atmospheric-air intake part 23b of the pressure sensor 23. In this way, water can be prevented from entering the pressure sensor 23 even if the water enters the space defined by the atmospheric-air box base 53 and the atmospheric-air box cover 24. In addition, the water entering the space defined by the atmospheric-air box base 53 and the atmospheric-air box cover 24 can be discharged exteriorly from the drain hole 53a.

The pressure sensor 23 and the atmospheric-air box cover 24 are both mounted to the sensor mounting part 50. This means that the atmospheric-air box cover 24 is disposed near the pressure sensor 23. Thus, the pressure sensor 23 and the atmospheric-air box cover 24 can be mounted at desired heights, respectively. This also enables reliable prevention of water movement from the space defined by the atmospheric-air box base 53 and the atmospheric-air box cover 24 to the pressure sensor 23.

The atmospheric-air box base 53 and the atmospheric-air box cover 24 are formed to be long, and the drain hole 53a is formed at the one end longitudinally of the atmospheric-air box base 53, while the atmospheric-air intake pipe 25 is connected at the end longitudinally of the atmospheric-air box cover 24 that is opposite from the drain hole 53a. The atmospheric-air intake pipe 25 is thus at a great distance from the drain hole 53a, so that even if water enters from the drain hole 53a, the water can be prevented from moving to the pressure sensor 23 through the atmospheric-air intake pipe 25.

The drain hole 53a is formed in the lower face of the atmospheric-air box base 53, while the atmospheric-air intake pipe 25 is connected at the upper portion of the lateral face of the atmospheric-air box cover 24 or at the upper face of the atmospheric-air box cover 24. The atmospheric-air intake pipe 25 is at a great distance from the drain hole 53a even in this case, so that even if water enters from the drain hole 53a, the water can be prevented from moving to the pressure sensor 23 through the atmospheric-air intake pipe 25.

Figure 12:
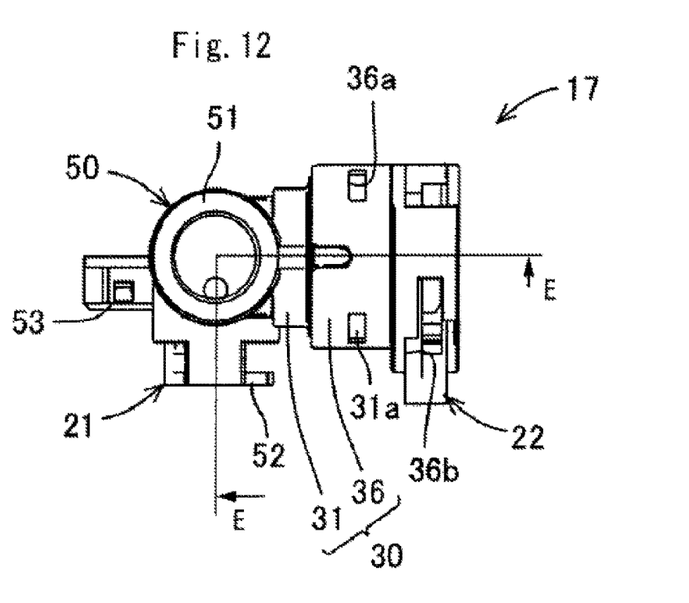
FIG. 12 is a plan view of the connector body and the retainer, as depicted in FIG. 5, with a cross-sectional line E-E bifurcating the connector body in an angle.

As shown in FIG. 12, when the connector body 21 is viewed from the opening of the second main tubular part 40, inner peripheral surfaces of the tubular intake part 51 all come into sight depth-ward. Line E-E is shown as bisecting the connector body 21 at an angle such that a cross section is perpendicular to the first main tubular part 30, the second main tubular part 40, and the sensor mounting part 50.

Figure 13:
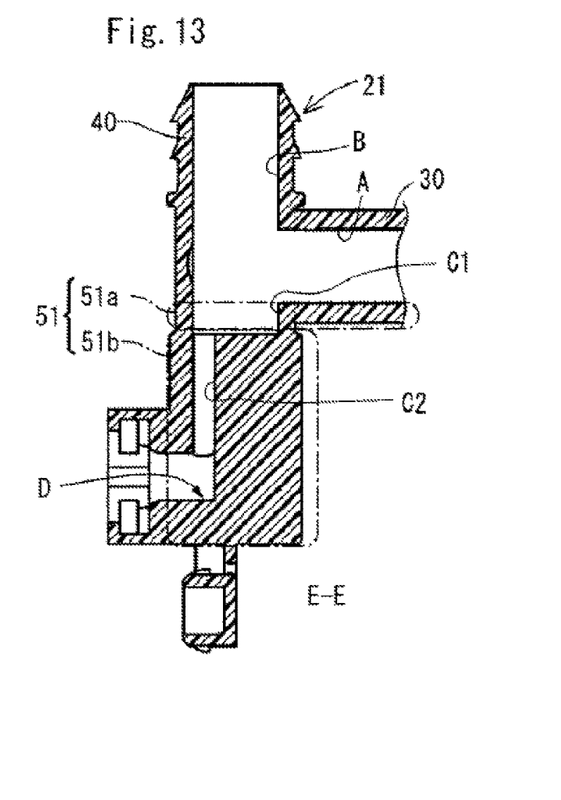
FIG. 13 is a sectional view of the connector body and the retainer taken along arrowed line E-E in FIG. 12.

FIG. 13 illustrates a cross section of the connector body 21 taken along Line E-E of FIG. 12. The cross section of the connector body 21 is shown perpendicular to the first main tubular part 30, the second main tubular part 40, and the sensor mounting part 50.

What is claimed is:

1. A connector comprising:
a connector body made of resin, the connector body including a first main tubular part configured to be connected to a first pipe, a second main tubular part configured to be connected to a second pipe, and a sensor mounting part; and
a pressure sensor configured to detect pressure of fluid that passes through the connector body, the pressure sensor being mounted to the sensor mounting part, wherein:
the first main tubular part and the second main tubular part connect with each other to form an angle;
the sensor mounting part includes:
a tubular intake part formed in line with a line extending from one of the first main tubular part and the second main tubular part, the tubular intake part including a bottom face; and
a sensor mounting seat that is capable of being mounted with the pressure sensor, the sensor mounting seat communicating with a peripheral-surface opening of the tubular intake part; and
the tubular intake part includes:
a large-diameter part having a first passage aligned and formed coaxially with an end of one of the first main tubular part or the second main tubular part, the first passage being directly connected to and having a same diameter as a diameter of the end of the one of the first main tubular part or the second main tubular part; and
a small-diameter part having a second passage that is connected to the first passage, a diameter of the second passage being smaller than the diameter of the first passage, and a cross-sectional area of the second passage being smaller than a cross-sectional area of the first passage, the second passage having the bottom face of the tubular intake part on an opposite side of the first passage;
the first passage is directly connected to the second passage;
an axial cross section of the second passage is aligned with an axial cross section of the first passage in an axial direction of the tubular intake part; and
the axial cross section of the first passage is aligned, in an axial direction of the tubular intake part, with one of: an axial cross section of a passage of the first main tubular part or an axial cross section of a passage of the second main tubular part.

2. The connector according to claim 1, wherein:
the sensor mounting part further includes an atmospheric-air box base;
the connector further comprises:
an atmospheric-air box cover mounted to the atmospheric-air box base, the atmospheric-air box cover being configured to receive atmospheric air in association with the atmospheric-air box base; and
an atmospheric-air intake pipe connecting the pressure sensor and the atmospheric-air box cover; and
the pressure sensor detects the pressure of the fluid that passes through the connector body on the basis of atmospheric pressure in a space defined by the atmospheric-air box base and the atmospheric-air box cover.

3. The connector according to claim 2, wherein:
the atmospheric-air box base includes a drain hole; and
the drain hole is formed below an atmospheric-air intake part of the pressure sensor.

4. The connector according to claim 3, wherein:
the atmospheric-air box base and the atmospheric-air box cover are formed to be long;
the drain hole is formed at one end longitudinally of the atmospheric-air box base; and
the atmospheric-air intake pipe is connected at an end longitudinally of the atmospheric-air box cover that is opposite from the drain hole.

5. The connector according to claim 3, wherein:
the drain hole is formed in a lower face of the atmospheric-air box base; and
the atmospheric-air intake pipe is connected at one of an upper portion of a lateral face of the atmospheric-air box cover and an upper face of the atmospheric-air box cover.

6. The connector according to claim 1, wherein the connector body is connected between a fuel tank and a canister.

7. The connector according to claim 1, wherein the cross-sectional area of the second passage is non-concentric with the cross-sectional area of the first passage.

8. The connector according to claim 1, wherein the second passage connects the first passage to the peripheral-surface opening.

* * * * *